(12) United States Patent
Sakaue et al.

(10) Patent No.: US 10,279,878 B2
(45) Date of Patent: May 7, 2019

(54) UNDERWATER DOCKING SYSTEM FOR AUTONOMOUS UNDERWATER VEHICLE

(71) Applicant: KAWASAKI JUKOGYO KABUSHIKI KAISHA, Kobe-shi, Hyogo (JP)

(72) Inventors: Hiroshi Sakaue, Kobe (JP); Minehiko Mukaida, Kobe (JP); Noriyuki Okaya, Kobe (JP); Takashi Okada, Kobe (JP); Fumitaka Tachinami, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/766,429

(22) PCT Filed: Oct. 4, 2016

(86) PCT No.: PCT/JP2016/079492
§ 371 (c)(1),
(2) Date: Apr. 6, 2018

(87) PCT Pub. No.: WO2017/061427
PCT Pub. Date: Apr. 13, 2017

(65) Prior Publication Data
US 2018/0319473 A1      Nov. 8, 2018

(30) Foreign Application Priority Data
Oct. 6, 2015     (JP) ................................. 2015-198608

(51) Int. Cl.
*B63G 8/00*     (2006.01)
*B63C 11/00*    (2006.01)
(Continued)

(52) U.S. Cl.
CPC .............. *B63G 8/001* (2013.01); *B63C 11/00* (2013.01); *B63C 11/48* (2013.01); *G01S 1/70* (2013.01);
(Continued)

(58) Field of Classification Search
CPC ........ B63G 2008/002; B63G 2008/004; B63G 2008/005; B63G 2008/007; B63G 2008/008; B64F 1/14
See application file for complete search history.

(56) References Cited

U.S. PATENT DOCUMENTS 1,848,828 A * 3/1932 Griffin ...................... B64F 1/14
                                                         244/116
3,656,308 A * 4/1972 Serrano .................. B63G 8/001
                                                         405/189
(Continued)

FOREIGN PATENT DOCUMENTS

JP    2000272583 A  *  3/1999
JP    2000-272583 A    10/2000

OTHER PUBLICATIONS

Dec. 13, 2016 International Search Report issued in Patent Application No. PCT/JP2016/079492.

*Primary Examiner* — Andrew Polay
(74) *Attorney, Agent, or Firm* — Oliff PLC

(57) ABSTRACT

An underwater docking system for an autonomous underwater vehicle, the underwater docking system including: an underwater station including a base mount fixed to a seabed and a circular frame member supported by the base mount and parallel to a horizontal plane; and an autonomous underwater vehicle configured to dock with the underwater station while sailing through an upper side of the frame member, wherein: the autonomous underwater vehicle includes an underwater vehicle main body.

7 Claims, 4 Drawing Sheets

(51) Int. Cl.
*B63C 11/48* (2006.01)
*G01S 1/70* (2006.01)
*G01S 5/28* (2006.01)
*H02J 50/00* (2016.01)

(52) U.S. Cl.
CPC ............... G01S 5/28 (2013.01); H02J 50/00 (2016.02); *B63G 2008/004* (2013.01); *B63G 2008/008* (2013.01)

(56) References Cited

U.S. PATENT DOCUMENTS

| | | | | |
|---|---|---|---|---|
| 3,757,722 A | * | 9/1973 | Seiple | B63G 8/00 114/322 |
| 7,025,014 B1 | * | 4/2006 | Forgach | B63B 21/66 114/244 |
| 8,622,014 B2 | * | 1/2014 | Lundberg | B63G 8/001 114/312 |

* cited by examiner

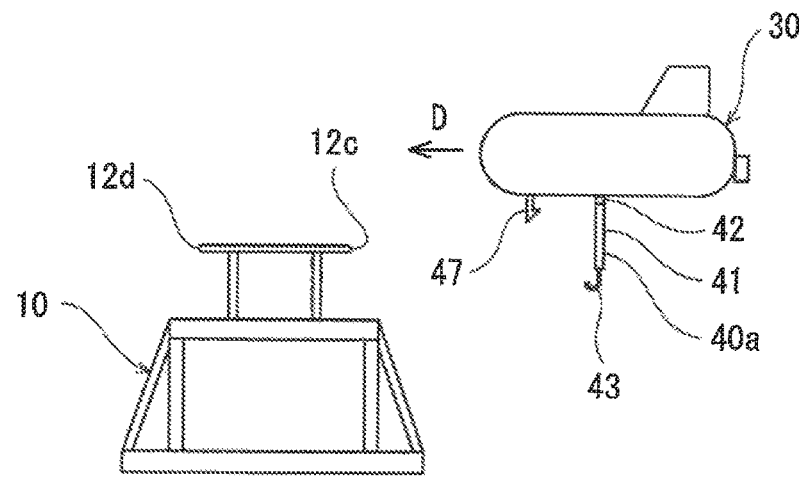
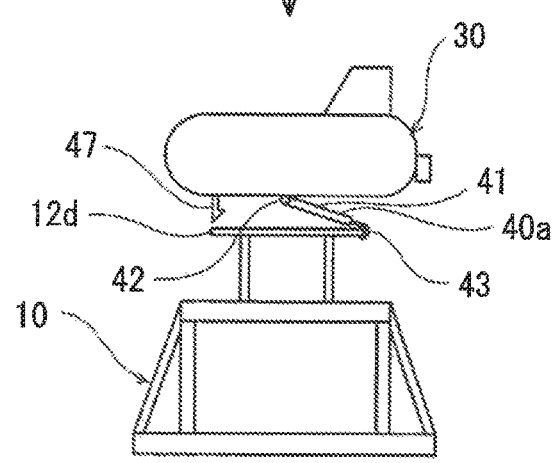
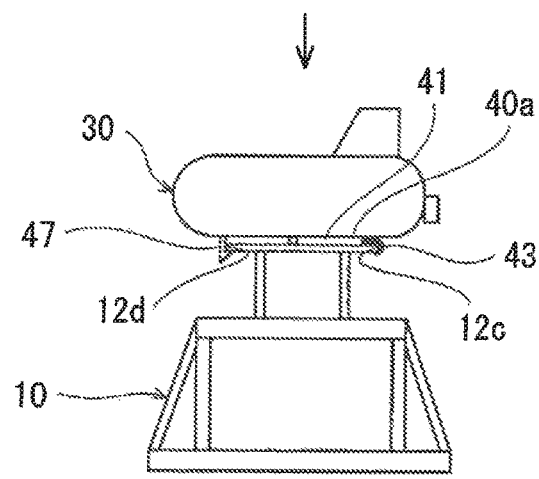

UNDERWATER DOCKING SYSTEM FOR AUTONOMOUS UNDERWATER VEHICLE

TECHNICAL FIELD

The present invention relates to an underwater docking system for an autonomous underwater vehicle.

BACKGROUND ART

Conventionally known is an autonomous underwater vehicle (hereinafter may be referred to as an "AUV") which does not require electric power supply from a mother ship and sails in water by a built-in power source for seabed work, seabed investigation, and the like. PTL 1 discloses an underwater docking system for docking the AUV with an underwater station capable of charging the AUV in water and performing data exchange with the AUV in water.

According to the underwater docking system of PTL 1, the AUV is provided with a capturing arm including a tip end having a hook, and the hook of the capturing arm of the AUV that sails is hooked on a capturing member provided at the underwater station. Thus, the AUV docks with the underwater station. The capturing member is formed in a V shape that narrows from an AUV entering side toward a tip end of the capturing member. Therefore, even when an entering angle of the AUV deviates to some extent, the capturing member guides the hooked capturing arm to a middle portion of the V shape.

CITATION LIST

Patent Literature

PTL 1: Japanese Laid-Open Patent Application Publication No. 2000-272583

SUMMARY OF INVENTION

Technical Problem

However, according to the underwater docking system disclosed in PTL 1, a direction in which the AUV enters the underwater station is limited to one direction. Therefore, the AUV cannot enter the underwater station in a stable posture due to influences of a tidal current or the like, and thus, sure docking of the AUV with the underwater station cannot be achieved.

An object of the present invention is to provide an underwater docking system for an AUV, the underwater docking system being configured such that the AUV can dock with an underwater station from any direction of 360°.

Solution to Problem

To solve the above problems, an underwater docking system for an AUV according to the present invention includes: an underwater station including a base mount fixed to a seabed and a circular frame member supported by the base mount and parallel to a horizontal plane; and an AUV configured to dock with the underwater station while sailing through an upper side of the frame member, wherein: the AUV includes an underwater vehicle main body, at least one capturing arm provided at a lower portion of the underwater vehicle main body, the at least one capturing arm including one end coupled to the underwater vehicle main body so as to be rotatable in a forward/rearward direction and the other end at which an engaging hook configured to be engaged with the frame member is provided, and a locking mechanism provided at the lower portion of the underwater vehicle main body and configured to be locked to a front portion of the frame member in a sailing direction of the AUV when the engaging hook is engaged with a rear portion of the frame member in the sailing direction, and the underwater vehicle main body has approached the frame member while the capturing arm rotates rearward.

According to the above configuration, when the AUV sails through the upper side of the frame member, the engaging hook of the capturing arm is engaged with the frame member, and the locking mechanism is locked to the frame member. With this, the AUV docks with the underwater station. The frame member has a circular shape that is symmetrical about a central axis of the frame member. Therefore, even when the AUV enters the underwater station from any direction of 360°, the engaging hook of the capturing arm is engaged with the rear portion of the frame member in the sailing direction of the AUV, and the locking mechanism is locked to the front portion of the frame member in the sailing direction of the AUV. Therefore, the AUV can dock with the underwater station from any direction of 360°.

The above underwater docking system for the AUV may be configured such that the locking mechanism is unlocked from the frame member by an electric signal. According to this configuration, after the AUV docks with the underwater station, the AUV can separate from the underwater station by unlocking the locking mechanism from the frame member by the electric signal.

The above underwater docking system for the AUV may be configured such that: the underwater station includes a light emitting portion provided on a central axis of the frame member and configured to emit light; and the AUV includes a light detector configured to detect the light emitted from the light emitting portion. According to this configuration, the light detector of the AUV can detect the light emitted from the light emitting portion. Based on this detection result, the AUV sails through the central axis of the frame member. With this, the underwater docking of the AUV with the underwater station can be surely performed.

The above underwater docking system for the AUV may be configured such that: the light detector has a function of taking an image of the light emitted from the light emitting portion; and the AUV includes a propulsion device and a control device configured to control the propulsion device based on data of the image taken by the light detector. According to this configuration, based on the data of the image of the light emitted from the light emitting portion, the AUV can sail through the central axis of the frame member.

The above underwater docking system for the AUV may be configured such that: a transponder configured to transmit an acoustic signal is provided at the underwater station; an acoustic positioning device configured to measure a position of the AUV relative to the transponder based on the acoustic signal from the transponder is provided at the AUV; when a distance from the underwater station to the AUV is longer than a predetermined distance, the control device controls the propulsion device based on data of the position acquired by the acoustic positioning device; and when the distance from the underwater station to the AUV is not more than the predetermined distance, the control device controls the propulsion device based on data of the image acquired by the light detector. According to this configuration, the acoustic positioning device can measure the position of the AUV relative to the underwater station based on the acoustic signal transmitted from the transponder, and the AUV can be guided to the underwater station from a position away from the underwater station by a middle or long distance. When the AUV has approached the underwater station, the control device switches from control based on the position data acquired by the acoustic positioning to control based on the data of the image of the light emitted from the light emitting portion. Therefore, the AUV can be accurately moved closer to the underwater station.

The above underwater docking system for the AUV may be configured such that: a noncontact electricity supplying portion is provided at a middle of the frame member; and a noncontact electricity receiving portion configured to receive electricity from the noncontact electricity supplying portion is provided at a lower portion of the underwater vehicle main body. According to this configuration, after the AUV docks with the underwater station, electricity can be supplied from the noncontact electricity supplying portion of the underwater station to the noncontact electricity receiving portion of the AUV.

The above underwater docking system for the AUV may be configured such that the at least one capturing arm includes two capturing arms provided so as to be spaced apart from each other in a leftward/rightward direction. When the number of capturing arms is one, to surely engage the engaging hook of the capturing arm with the frame member, the width of the engaging hook in the leftward/rightward direction needs to be increased, or a mechanism configured to lock a state where the engaging hook is engaged with the frame member is required. However, if the width of the engaging hook is increased, water resistance increases. Further, if the engaging hook includes such locking mechanism, the capturing arm and the engaging hook become complex in configuration. According to the above configuration, the engaging hook of the capturing arm can be surely engaged with the frame member by simple configurations without increasing water resistance.

Advantageous Effects of Invention

The present invention can provide an underwater docking system for an AUV, the underwater docking system being configured such that the AUV can dock with an underwater station from any direction of 360°.

BRIEF DESCRIPTION OF DRAWINGS

FIGS. 4A to 4C are diagrams showing a flow of docking the AUV with the underwater station by the underwater docking system of FIG. 1.

DESCRIPTION OF EMBODIMENTS

Figure 1:
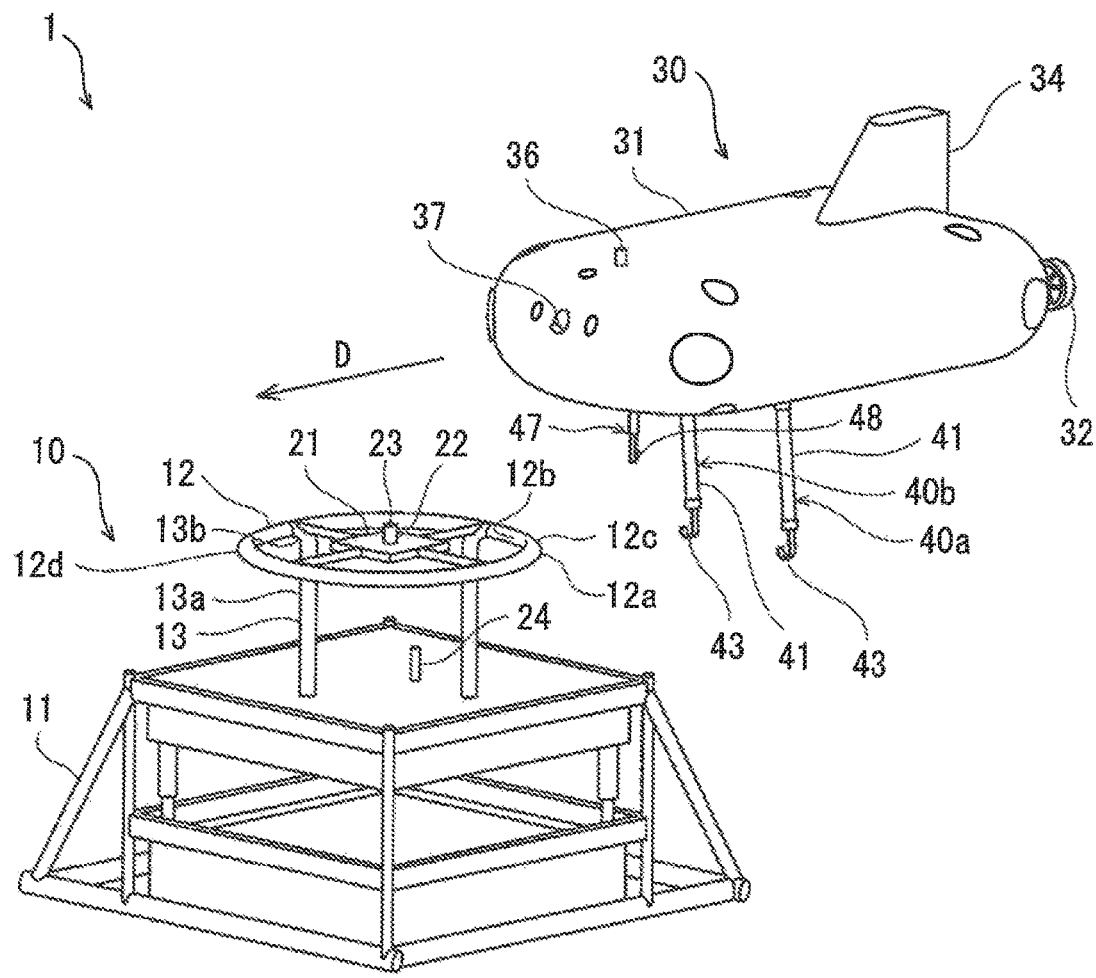
FIG. 1 is a schematic configuration diagram of an underwater docking system for an AUV according to one embodiment of the present invention.
Figure 2:
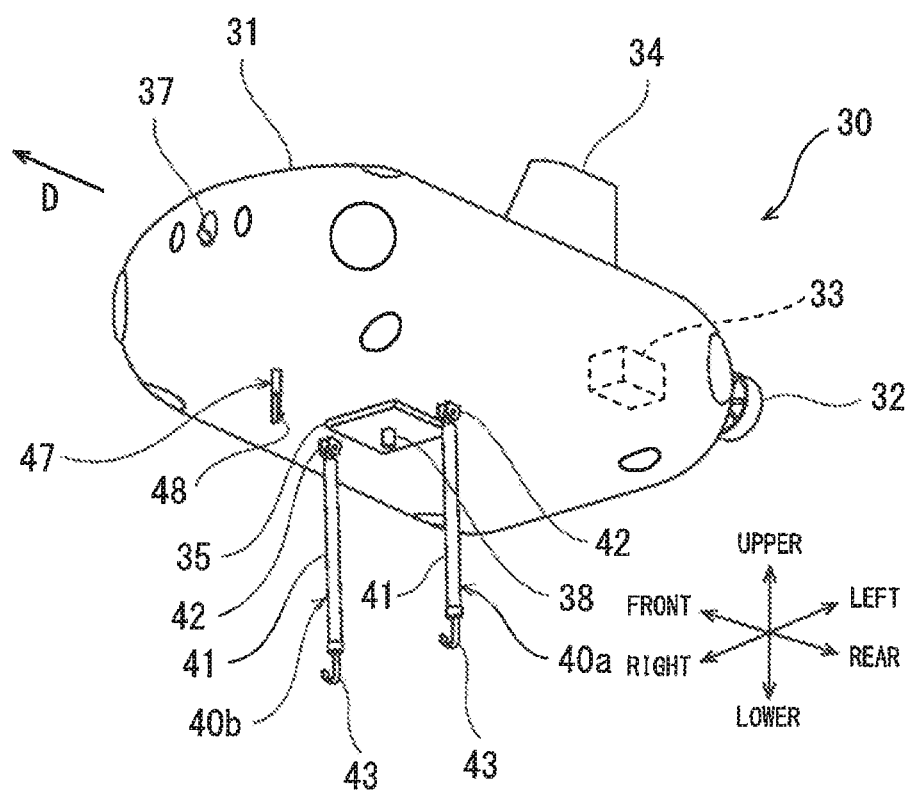
FIG. 2 is a schematic perspective view when viewing the AUV of the underwater docking system of FIG. 1 obliquely from below.
Figure 3:
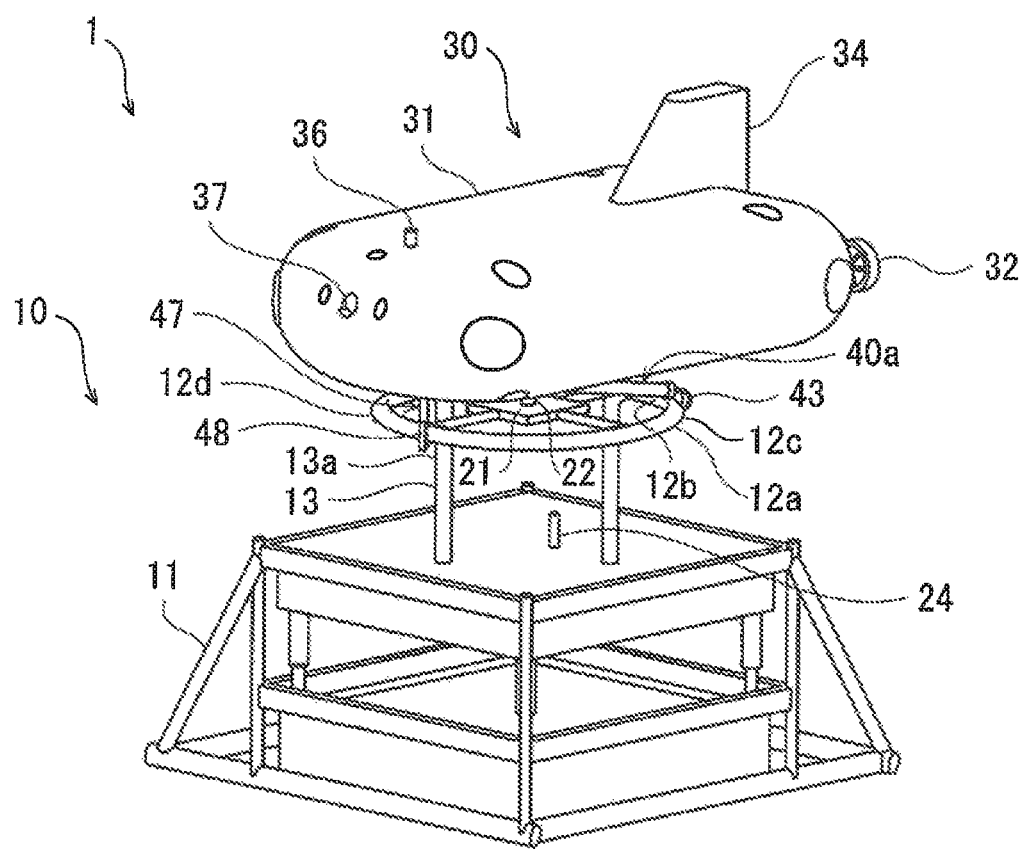
FIG. 3 is a diagram showing a state where the AUV docks with an underwater station by the underwater docking system of FIG. 1.

Hereinafter, an embodiment of the present invention will be explained in reference to the drawings. FIG. 1 is a schematic configuration diagram an underwater docking system (hereinafter referred to as a "docking system") 1 for an AUV 30 according to one embodiment. FIG. 2 is a schematic perspective view when viewing the AUV 30 obliquely from below. FIG. 3 is a diagram showing a state where the AUV 30 docks with an underwater station 10 by he docking system 1.

The docking system 1 includes: the underwater station 10 provided in water; and the AUV 30 configured to dock with the underwater station 10. The underwater station 10 is connected to a land facility through a cable (not shown) and can be supplied with electricity from the land facility and transmit data to and receive data from the land facility. As shown in FIG. 1, the underwater station 10 includes: a base mount 11 fixed to a seabed; and a circular frame member 12 provided above the base mount 11 and parallel to a horizontal plane. The wording "parallel to a horizontal plane" denotes not only a case where the frame member 12 is completely parallel to the horizontal plane but also a case where the frame member 12 is substantially parallel to the horizontal plane such as a case where the underwater station 10 is provided on a seabed surface slightly inclined relative to the horizontal plane.

An outer peripheral portion 12a that is an outer peripheral side portion of the frame member 12 is formed so as to be engaged with below-described engaging hooks 43 of capturing arms 40a and 40b of the AUV 30. In the present embodiment, the circular frame member 12 is formed in an annular shape in plan view and has a circular cross-sectional shape. It should be noted that the frame member 12 does not have to have the annular shape and may have such a circular plate shape that an outer peripheral portion thereof is formed so as to be engaged with the engaging hooks 43. Further, the cross-sectional shape of the annular frame member 12 does not have to be circular and may be polygonal, for example.

The frame member 12 is supported by a plurality of supporting portions 13 provided at the base mount 11. Each of the supporting portions 13 has a substantially inverted L shape and includes a long part 13a and a short part 13b. The long part 13a extends to an upper side from a seabed surface side of the frame member 12, and the short part 13b extends from an upper end of the long part 13a toward an inner peripheral portion 12b that is an inner peripheral side portion of the frame member 12.

A noncontact electricity supplying portion 21 configured to supply electricity to the AUV 30 is provided at a middle of the frame member 12. Each of the noncontact electricity supplying portion 21 and a below-described noncontact electricity receiving portion 35 includes, for example, a flat plate-shaped housing and a coil formed in the housing and having a circular shape. The noncontact electricity supplying portion 21 is substantially flush with the frame member 12 so as to oppose the noncontact electricity receiving portion 35 of the AUV 30 when the AUV 30 docks with the underwater station 10 (see FIG. 3). In the present embodiment, the noncontact electricity supplying portion 21 is supported by a supporting member extending from the frame member 12 but may be supported by a supporting member extending from the base mount 11 or a supporting member extending from the supporting portions 13.

As shown in FIG. 1, an optical wireless communication device 22 configured to communicate with the AUV 30 is provided on a central axis of the circular frame member 12. The optical wireless communication device 22 includes a light emitting portion 23 configured to emit light for performing optical wireless communication with a below-described optical wireless communication device 38 (see FIG. 2) of the AUV 30. Although details will be described later, in the present embodiment, the light emitting portion 23 of the optical wireless communication device 22 also plays a role of emitting light as a marker indicating a course along which the AUV 30 sails. In the present embodiment, the optical wireless communication device 22 and the light emitting portion 23 are provided on an upper surface of the noncontact electricity supplying portion 21 and arranged at a center position of the circular frame member 12.

As shown in FIG. 1, a transponder 24 configured to transmit an acoustic signal is provided at the base mount 11 of the underwater station 10. The transponder 24 and a below-described acoustic positioning device 36 constitute an acoustic positioning system configured to measure the position of the AUV 30 relative to the underwater station 10.

Next, the configuration of the AUV 30 will be explained in reference to FIGS. 1 and 2. The AUV 30 docks with the underwater station 10 while sailing through an upper side of the frame member 12. In the following explanation, a sailing direction in which the AUV 30 sails is defined as a front side, and a direction opposite to the sailing direction is defined as a rear side. A left side when facing the sailing direction is defined as a left side, and a right side when facing the sailing direction is defined as a right side. An upper side when facing the sailing direction is defined as an upper side, and a lower side when facing the sailing direction is defined as a lower side.

The AUV 30 includes: an underwater vehicle main body 31 incorporating a storage battery as a power source; and some propulsion devices 32 (only one propulsion device 32 is shown in the drawings), such as propellers, configured to generate propulsive force for sailing in water. As shown in FIG. 2, the AUV 30 includes a control device 33 provided in the underwater vehicle main body 31 and configured to control the propulsion device 32. The AUV 30 autonomously sails in accordance with a program of the control device 33.

A front portion of the underwater vehicle main body 31 has a streamline shape that is low in water resistance. Upper and lower portions of the underwater vehicle main body 31 are formed to have respective flat surfaces parallel to each other. A vertical wing 34 configured to define a horizontal posture of the AUV 30 is provided at a rear side of the upper portion of the underwater vehicle main body 31. As shown in FIG. 2, the above-described noncontact electricity receiving portion 35 configured to receive electricity from the noncontact electricity supplying portion 21 of the underwater station 10 is provided at the lower portion of the underwater vehicle main body 31. As shown in FIG. 3, the noncontact electricity receiving portion 35 is arranged so as to oppose the noncontact electricity supplying portion 21 when the AUV 30 docks with the underwater station 10.

Two capturing arms 40a and 40b configured to capture the frame member 12 are provided at the lower portion of the underwater vehicle main body 31. The two capturing arms 40a and 40b are provided at respective left and right symmetrical positions of the underwater vehicle main body 31 so as to be spaced apart from each other in a leftward/rightward direction of the underwater vehicle main body 31. The capturing arms 40a and 40b include respective rod-shaped portions 41 linearly extending to the lower side. The capturing arms 40a and 40b are provided so as to be suspended from the underwater vehicle main body 31 through respective coupling portions 42. As shown in FIG. 2, each of one end of the capturing arm 40a and one end of the capturing arm 40b is coupled through the corresponding coupling portion 42, fixed to the lower portion of the underwater vehicle main body 31, so as to be rotatable in the forward/rearward direction. Further, the engaging hooks 43 configured to be engaged with the frame member 12 are provided at the respective other ends of the capturing arms 40a and 40b. Each of the engaging hooks 43 is formed so as to be open to the front side, extends to the lower side from a lower end of the corresponding rod-shaped portion 41, and curve toward the front side as the engaging hook 43 extends toward a tip end of the engaging hook 43. The engaging hooks 43 are engaged with a rear portion 12c of the frame member 12 in a sailing direction D.

A locking mechanism 47 configured to be locked to the frame member 12 is provided at the lower portion of the underwater vehicle main body 31. When the AUV 30 sails through the upper side of the frame member 12, the engaging hooks 43 are engaged with the rear portion 12c of the frame member 12 in the sailing direction D. Then, when the underwater vehicle main body 31 has approached the frame member 12 while the capturing arms 40a and 40b rotate rearward, the locking mechanism 47 is locked to a front portion 12d of the frame member 12 in the sailing direction D.

The locking mechanism 47 includes a locking claw 48 configured to be locked to the frame member 12. The locking claw 48 moves between a locked position where the locking claw 48 is locked to the frame member 12 and an unlocked position where the locking claw 48 is unlocked from the frame member 12. When the engaging hooks 43 are engaged with the frame member 12, and the underwater vehicle main body 31 has approached the frame member 12, the locking mechanism 47 is automatically locked to the frame member 12. The locking mechanism 47 may have any configuration. For example, the locking mechanism 47 may be configured such that: the locking claw 48 is biased toward the locked position; when the locking claw 48 is pushed by the frame member 12 from the lower side, the locking claw 48 moves toward the unlocked position; and when the frame member 12 moves to the upper side of the locking claw 48, the locking claw 48 returns to the locked position.

When the AUV 30 separates from the underwater station 10, the locking mechanism 47 can be unlocked from the frame member 12 by an electric signal. In the present embodiment, the locking mechanism 47 includes an actuator (not shown) configured to drive the locking claw 48. The control device 33 transmits the electric signal to the actuator, and the actuator moves the locking claw 48 from the locked position to the unlocked position.

The acoustic positioning device 36 is provided at the upper portion of the underwater vehicle main body 31. As described above, the acoustic positioning device 36 and the transponder 24 of the underwater station 10 constitute the acoustic positioning system configured to measure the position of the AUV 30 relative to the underwater station 10. The acoustic positioning system is, for example, a SSBL (Super Short Base Line) positioning system configured such that: a distance to the transponder 24 is calculated from a time until when the acoustic signal from the transponder 24 is received; and a direction is calculated based on a phase difference of sound waves which have reached respective elements of a wave receiving array included in the acoustic positioning device 36. In the present embodiment, this positioning system is used when a distance from the underwater station 10 to the AUV 30 is longer than a predetermined distance (for example, 10 meters). The control device 33 controls the propulsion device 32 based on position data acquired by the acoustic positioning device 36 to guide the AUV 30 to the underwater station 10.

A light detector 37 configured to detect the light emitted from the light emitting portion 23 of the underwater station 10 is provided at a front end portion of the underwater vehicle main body 31. In the present embodiment, the light detector 37 is an image pickup device having a function of taking an image of the light emitted from the light emitting portion 23. The light detector 37 is used to measure the position of the AUV 30 when the AUV 30 is located within a range of not less than a predetermined distance (for example, 10 meters) from the underwater station 10. More specifically, the light detector 37 of the AUV 30 takes an image of the light emitted from the light emitting portion 23 and transmits data of the image to the control device 33. The control device 33 acquires data of the position of the AUV 30 relative to the underwater station 10 based on the data of the image. The propulsion device 32 is controlled based on the data of the position. Thus, the AUV 30 sails toward the underwater station 10 such that the rod-shaped portions 41 of the capturing arms 40a and 40b contact the frame member 12.

The optical wireless communication device 38 is provided at the lower portion of the underwater vehicle main body 31. The optical wireless communication device 38 of the AUV 30 and the above-described optical wireless communication device 22 of the underwater station 10 are arranged so as to be able to mutually perform wireless communication when the AUV 30 docks with the underwater station 10 as shown in FIG. 3. In the present embodiment, the optical wireless communication device 38 of the AUV 30 is arranged on a lower surface of the noncontact electricity receiving portion 35 so as to be located on the central axis of the frame member 12 when the AUV 30 docks with the underwater station 10. By the optical wireless communication devices 22 and 38, the AUV 30 can, for example, transmit to the underwater station 10 inspection data acquired by an inspection performed by the AUV 30, and the underwater station 10 can, for example, transmit an operation program of the AUV 30 to the AUV 30.

Next, a flow of docking the AUV 30 with the underwater station 10 by the docking system 1 according to the present embodiment will be explained in reference to FIG. 4.

First, when the underwater station 10 is located at a position away from the AUV 30 by a middle or long distance, in other words, when a distance from the AUV 30 to the underwater station 10 is longer than a predetermined distance (for example, 10 meters), the AUV 30 moves toward the underwater station 10 by using the acoustic positioning system. More specifically, based on the acoustic signal transmitted from the transponder 24 of the underwater station 10, the AUV 30 measures the position of the AUV 30 relative to the underwater station 10. Based on the acquired data of the position of the AUV 30, the control device 33 of the AUV 30 controls the propulsion device 32 to guide the AUV 30 to the underwater station 10.

When the underwater station 10 is located at a position away from the AUV 30 by a short distance, in other words, when the distance from the AUV 30 to the underwater station 10 is not more than a predetermined distance (for example, 10 meters), as shown in FIG. 4A, the AUV 30 controls the propulsion device 32 based on the data acquired from the light detector 37 so as to pass through the upper side of the frame member 12. More specifically, the light detector 37 of the AUV 30 takes the image of the light emitted from the light emitting portion 23 located on the central axis of the frame member 12 and transmits the data of the image to the control device 33. Next, the control device 33 of the AUV 30 acquires the data of the position of the AUV 30 relative to the frame member 12 based on the data of the image and controls the propulsion device 32 based on the data of the position.

When the AUV 30 sails through the upper side of the frame member 12, the rod-shaped portions 41 of the capturing arms 40a and 40b contact the rear portion 12c of the frame member 12 in the sailing direction D. When the AUV 30 further sails, the rod-shaped portions 41 of the capturing arms 40a and 40b guide the frame member 12 to the engaging hooks 43 while the capturing arms 40a and 40b rotate rearward about the respective coupling portions 42. Then, as shown in FIG. 4B, the engaging hooks 43 are engaged with the rear portion 12c of the frame member 12.

After that, while the capturing arms 40a and 40b further rotate rearward, the underwater vehicle main body 31 rotates about a portion where the engaging hooks 43 are engaged with the rear portion 12c of the frame member 12, and approaches the frame member 12. As a result, as shown in FIG. 4C, the locking mechanism 47 contacts and is locked to the front portion 12d of the frame member 12 in the sailing direction D. With this, the docking of the AUV 30 with the underwater station 10 is completed.

It should be noted that in a state where the AUV 30 docks with the underwater station 10, the noncontact electricity receiving portion 35 opposes the noncontact electricity supplying portion 21, and the supply of the electricity from the noncontact electricity supplying portion 21 to the noncontact electricity receiving portion 35 is realized. Thus, the work of charging the AUV 30 can be performed. Further, in a state where the AUV 30 docks with the underwater station 10, the optical wireless communication device 38 of the AUV 30 and the optical wireless communication device 22 of the underwater station 10 can mutually perform the optical wireless communication, and the AUV 30 can transmit data to and receive data from the underwater station 10. After predetermined work such as the charging work or data transmission and reception is performed, the AUV 30 transmits the electric signal to the locking mechanism 47 to unlock the locking mechanism 47 from the frame member 12, and then can separate from the underwater station 10 by driving the propulsion device 32.

As explained above, according to the docking system 1 of the present embodiment, when the AUV 30 sails through the upper side of the frame member 12, the engaging hooks 43 of the capturing arms 40a and 40b are engaged with the frame member 12, and the locking mechanism 47 is locked to the frame member 12. With this, the AUV 30 docks with the underwater station 10. The frame member 12 has a circular shape that is symmetrical about the central axis of the frame member 12. Therefore, even when the AUV 30 enters the underwater station 10 from any direction of 360°, the engaging hooks 43 of the capturing arms 40a and 40b are engaged with the rear portion 12c of the frame member 12 in the sailing direction D, and the locking mechanism 47 is locked to the front portion 12d of the frame member 12 in the sailing direction D. Therefore, the AUV 30 can dock with the underwater station 10 from any direction of 360°.

In the present embodiment, the locking mechanism 47 can be unlocked from the frame member 12 by the electric signal. Therefore, after the AUV 30 docks with the underwater station 10, the AUV 30 can separate from the underwater station 10 by unlocking the locking mechanism 47 from the frame member 12 by the electric signal.

In the present embodiment, the light detector 37 of the AUV 30 detects the light emitted from the light emitting portion 23 provided on the central axis of the frame member 12, and based on the detection result, the AUV 30 can sail through the central axis of the frame member 12. With this, the underwater docking of the AUV 30 with the underwater station 10 can be surely performed.

In the present embodiment, the light detector 37 has a function of taking the image of the light emitted from the light emitting portion 23. Therefore, based on the data of the image of the light emitted from the light emitting portion 23, the control device 33 can control the propulsion device 32 to cause the AUV 30 to sail through the central axis of the frame member 12.

In the present embodiment, the acoustic positioning device 36 measures the position of the AUV 30 relative to the underwater station 10 based on the acoustic signal transmitted from the transponder 24, and the AUV 30 is guided to the underwater station 10 from a position away from the underwater station 10 by a middle or long distance. When the AUV 30 has approached the underwater station 10, the control device 33 switches from control based on the position data acquired by the acoustic positioning to control based on the data of the image of the light emitted from the light emitting portion 23. Therefore, the AUV 30 can be accurately moved closer to the underwater station 10.

In the present embodiment, the noncontact electricity supplying portion 21 is provided at the middle of the frame member 12, and the noncontact electricity receiving portion 35 configured to receive electricity from the noncontact electricity supplying portion 21 is provided at the lower portion of the underwater vehicle main body 31. Therefore, after the AUV 30 docks with the underwater station 10, electricity can be supplied from the noncontact electricity supplying portion 21 of the underwater station 10 to the noncontact electricity receiving portion 35 of the AUV 30.

In the present embodiment, the AUV 30 includes the two capturing arms 40*a* and 40*b* spaced apart from each other in the leftward/rightward direction. When the number of capturing arms is one, to surely engage the engaging hook 43 of the capturing arm with the frame member 12, the width of the engaging hook 43 in the leftward/rightward direction needs to be increased, or a mechanism configured to lock a state where the engaging hook 43 is engaged with the frame member 12 is required. However, if the width of the engaging hook 43 is increased, water resistance increases. Further, if the engaging hook 43 includes such locking mechanism, the capturing arm and the engaging hook 43 become complex in configuration. In the present embodiment, since the AUV 30 includes the two capturing arms 40*a* and 40*b* spaced apart from each other in the leftward/rightward direction, the engaging hooks 43 of the capturing arms 40*a* and 40*b* can be surely engaged with the frame member 12 by simple configurations without increasing water resistance.

The above-described embodiment is in all aspects illustrative, and should be interpreted as not restrictive. The scope of the present invention is defined by the appended claims rather than by the description preceding them, and all changes that fall within metes and bounds of the claims, or equivalence of such metes and bounds thereof are therefore intended to be embraced by the claims.

For example, in the above embodiment, the locking mechanism 47 is automatically locked to the frame member 12 when the engaging hooks 43 are engaged with the frame member 12, and the underwater vehicle main body 31 has approached the frame member 12. However, the above embodiment is not limited to this. For example, the AUV 30 may include a detector configured to detect a state where the underwater vehicle main body 31 has approached the frame member 12 and reached a position where the locking mechanism 47 can be locked to the frame member 12, and the locking mechanism 47 may be controlled so as to be locked to the frame member 12 by a detection result from the detector.

In the above embodiment, the optical wireless communication device 22 and the light emitting portion 23 are arranged at the center position of the circular frame member 12. However, the above embodiment is not limited to this, and the optical wireless communication device 22 and the light emitting portion 23 may be arranged at any position as long as they are arranged in a range where they can achieve their functions. For example, the optical wireless communication device 22 and the light emitting portion 23 may be located slightly above or slightly under the center position of the circular frame member 12 as long as they are located within a range where they can perform optical wireless communication with the optical wireless communication device 38 of the AUV 30 after the docking.

The light emitting portion 23 of the optical wireless communication device 22 of the underwater station 10 plays not only a role of performing optical communication with the optical wireless communication device 38 of the AUV 30 but also a role of emitting light as a marker indicating a course along which the AUV 30 sails. However, a light emitting portion configured to emit light as a marker indicating a course along which the AUV 30 sails may be provided separately from the light emitting portion 23 of the optical wireless communication device 22. It is preferable that the light emitting portion configured to emit light as a marker indicating a course along which the AUV 30 sails be arranged on the central axis of the frame member 12 such that a positional relation between the frame member 12 and the light emitting portion is the same even when viewing the underwater station 10 from any direction of 360°.

The positioning system for the AUV 30 is not limited to the above embodiment. For example, the acoustic positioning system does not have to be the SSBL type and may be an LBL type, a SBL type, or the like. Even when the underwater station 10 is located at a position away from the AUV 30 by a short distance, the AUV 30 may be moved closer to the underwater station 10 by a method other than the above method using the image pickup device.

REFERENCE SIGNS LIST 1 underwater docking system
10 underwater station
11 base mount
12 frame member
12*c* rear portion of frame member
12*d* front portion of frame member
21 noncontact electricity supplying portion
23 light emitting portion
24 transponder
30 AUV (autonomous underwater vehicle)
31 underwater vehicle main body
32 propulsion device
33 control device
35 noncontact electricity receiving portion
36 acoustic positioning device
37 light detector
40*a*, 40*b* capturing arm
43 engaging hook
47 locking mechanism
D sailing direction

The invention claimed is:
1. An underwater docking system for an autonomous underwater vehicle, the underwater docking system comprising:

an underwater station including
- a base mount fixed to a seabed and
- a circular frame member supported by the base mount and parallel to a horizontal plane; and an autonomous underwater vehicle configured to dock with the underwater station while sailing through an upper side of the frame member, wherein:

the autonomous underwater vehicle includes
- an underwater vehicle main body,
- at least one capturing arm provided at a lower portion of the underwater vehicle main body, the at least one capturing arm including one end coupled to the underwater vehicle main body so as to be rotatable in a forward/rearward direction and the other end at which an engaging hook configured to be engaged with the frame member is provided, and
  - a locking mechanism provided at the lower portion of the underwater vehicle main body and configured to be locked to a front portion of the frame member in a sailing direction of the autonomous underwater vehicle when the engaging hook is engaged with a rear portion of the frame member in the sailing direction, and the underwater vehicle main body has approached the frame member while the capturing arm rotates rearward.

2. The underwater docking system according to claim 1, wherein the locking mechanism is unlocked from the frame member by an electric signal.

3. The underwater docking system according to claim 1, wherein:
- the underwater station includes a light emitting portion provided on a central axis of the frame member and configured to emit light; and
- the autonomous underwater vehicle includes a light detector configured to detect the light emitted from the light emitting portion.

4. The underwater docking system according to claim 3, wherein:

the light detector has a function of taking an image of the light emitted from the light emitting portion; and the autonomous underwater vehicle includes a propulsion device and a control device configured to control the propulsion device based on data of the image taken by the light detector.

5. The underwater docking system according to claim 4, wherein:
- a transponder configured to transmit an acoustic signal is provided at the underwater station;
- an acoustic positioning device configured to measure a position of the autonomous underwater vehicle relative to the transponder based on the acoustic signal from the transponder is provided at the autonomous underwater vehicle;
- when a distance from the underwater station to the autonomous underwater vehicle is longer than a predetermined distance, the control device controls the propulsion device based on data of the position acquired by the acoustic positioning device; and
- when the distance from the underwater station to the autonomous underwater vehicle is not more than the predetermined distance, the control device controls the propulsion device based on data of the image acquired by the light detector.

6. The underwater docking system according to claim 1, wherein:
- a noncontact electricity supplying portion is provided at a middle of the frame member; and
- a noncontact electricity receiving portion configured to receive electricity from the noncontact electricity supplying portion is provided at a lower portion of the underwater vehicle main body.

7. The underwater docking system according to claim 1, wherein the at least one capturing arm comprises two capturing arms provided so as to be spaced apart from each other in a leftward/rightward direction.

* * * * *